United States Patent [19]

Ogman

[11] 4,091,635

[45] May 30, 1978

[54] APPARATUS FOR CONCENTRATING A FEED STREAM

[75] Inventor: Abraham Ogman, Peabody, Mass.

[73] Assignee: Avco Corporation, Wilmington, Mass.

[21] Appl. No.: 715,423

[22] Filed: Aug. 18, 1976

[51] Int. Cl.² .......................... B01D 9/04; C02B 1/12
[52] U.S. Cl. .................................................. 62/123
[58] Field of Search .................................. 62/123, 532

[56] References Cited

U.S. PATENT DOCUMENTS

| | | | |
|---|---|---|---|
| 3,885,399 | 5/1975 | Campbell | 62/123 |
| 4,036,619 | 7/1977 | Ganiaris | 62/123 |

*Primary Examiner*—Ronald C. Capossela

*Attorney, Agent, or Firm*—Abraham Ogman

[57] ABSTRACT

This disclosure is directed to an apparatus and method for highly concentrating an already relatively concentrated feed stream in a two-stage freeze-crystallization system. The feed stream is introduced into the first stage freezer-crystallizer without prior dilution, which has heretofore been customary. Highly concentrated output is withdrawn from a first stage wash column. Diluted concentrate is recirculated in the second stage of the system. This relatively simple expedient of diluting in the second stage, rather than in the first, allows the system to treat highly contaminated feed streams directly and produces significant savings in energy for the same throughput.

4 Claims, 2 Drawing Figures

APPARATUS FOR CONCENTRATING A FEED STREAM

BACKGROUND OF THE INVENTION

1. Field of the Invention

This invention is in the field of liquid processing and more particularly relates to the concentration of feed streams.

2. Description of the Prior Art

Freeze-crystallization concentration systems are used to separate liquid feed streams into more purified liquid and a concentrate. These systems have many uses among which are: conversion of a contaminated waste water stream into fresh water and concentrate; desalination of sea water; concentration of solutions or suspensions containing food such as orange juice or coffee; separation from solution of chemicals having different freezing points; etc. In some of these cases, then, the desired product is purified water which can be obtained by melting ice formed in such systems, but in other cases the desired product is the concentrate.

Freeze-crystallization concentration processes operate by taking advantage of the scientific principle that ice crystals, as they freeze, exclude dissolved impurities, including organics, inorganics and volatiles. Thus, the resulting ice crystals consist of purified water.

Generally, freeze-crystallization systems include at least one freezer-crystallizer to form ice crystals and a concentrate and at least one wash column to separate ice from concentrate and to wash the surfaces of the ice crystals. Systems which include only one freezer-crystallizer and one wash column are referred to as one-step systems.

Those systems having two freezer-crystallizers and two wash columns are referred to as two-stage systems. One example of a two-stage freeze-crystallization system is described in U.S. Pat. No. 3,885,399 granted to Robert J. Campbell. The system described in this patent recycles concentrate from the first-stage wash column and uses the recycled concentrate as wash water in the second-stage wash column. This reduces the temperature difference in the second wash column to eliminate freezing on the screens which was a serious problem encountered in two-stage systems because of the large freezing point depression produced in concentrated solutions.

Two-stage freeze-crystallization concentration systems, such as disclosed in the Campbell patent, have proven to be very successful, in general. Nevertheless, they have been limited in their ability to treat highly contaminated feed streams. One reason for this is that when the concentration of the feed stream is relatively high, the ice crystals produced are relatively small and therefore difficult to wash. The rate of ice crystal growth is related inversely to the concentration of the liquid surrounding it. In order to overcome this difficulty, one of three approaches is available: (1) dilute the feed so relatively large crystals can be harvested from the first freezer, (2) retention time in the crystallizer could be increased by a very large amount, to several hours rather than a few minutes, to enable growing of crystals of sufficient size for easy washing, and (3) extremely large wash columns can be built in which small crystals can be washed. The first of these involves excessive energy consumption, while the latter two involve high capital costs. Because of this, it has heretofore been customary to dilute concentrated feed streams prior to their introduction into the first-stage freezer-crystallizer.

SUMMARY OF THE INVENTION

This invention relates to a two-stage freeze-crystallization concentration apparatus and method capable of accepting and processing concentrated feed streams without prior dilution.

The first stage of the apparatus includes a first freezer-crystallizer and means to introduce a concentrated feed stream into this freezer-crystallizer without dilution. A slurry of ice and highly concentrated output produced in this first freezer-crystallizer is introduced by appropriate means into a first wash column which functions to both wash and separate ice from highly concentrated output. This first wash column also has means for introducing therein wash water which is suitable for washing ice particles coated with a film of the highly concentrated output thereon. Highly concentrated output is withdrawn from the first wash column, and, depending upon the application, serves as product output or highly concentrated waste.

In the second stage, means are provided for introducing diluted concentrate into a second freezer-crystallizer which treats it to produce ice and an intermediate concentrate. A second wash column within the second stage functions to wash and separate ice produced in the second freezer-crystallizer from intermediate concentrate. Ice harvested from the second wash column can be melted to form purified water which can be withdrawn from the system or recirculated.

The two-stage freeze-crystallization apparatus and method described herein offer significant advantages over prior art systems. A major advantage is the capability of these systems to handle highly contaminated feed streams without the necessity for prior dilution. In addition, a substantial savings in energy can be attained by the systems described herein without any reduction in throughput.

DESCRIPTION OF PREFERRED EMBODIMENTS

For purposes of the description contained herein, the following terms are defined as follows:

Feed Stream: This is the input to the system and may be contaminated water, sea water, brackish water, industrial waste water, chemical process streams containing salts or other chemicals in suspension or solution, suspensions or solutions of food such as orange juice or coffee, etc. Generally, the feed stream will be an aqueous solution, but the term is not limited to aqueous solutions and also includes non-aqueous solutions containing solvents which can be freeze-crystallized.

Concentrate: This is the liquid portion of slurry produced by a freezer-crystallizer, and may consist of brine, liquor of industrial waste, food solutions or suspensions, or any other suitable solution of suspension containing dissolved solute or dispersed particles.

Dilute or Concentrated: These are relative terms which refer to the weight percentage of impurities, contaminates, salts, food or other dissolved solutes or suspended particles in a feed stream or concentrate.

The invention will now be described in more detail by reference to the Figures, wherein like numerals have been used to designate like elements. To further illustrate the invention, the assumption is made for both FIGS. 1 and 2 that it is desired to process two pounds of a 20% concentrated aqueous feed stream to produce one pound of 40% concentrated output and one pound of purified water.

Figure 1:
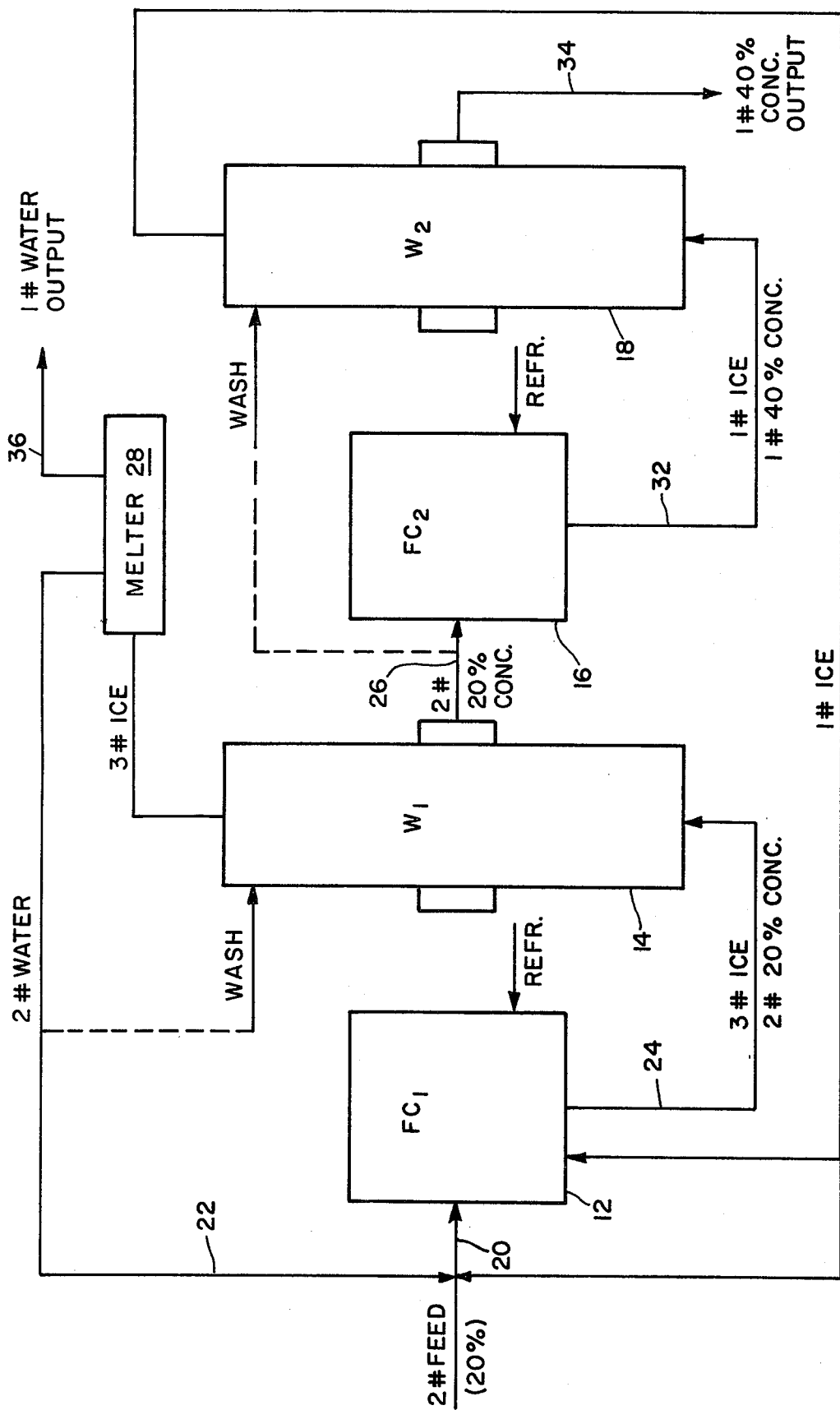
FIG. 1 is a schematic representation of a prior art two-stage freeze-crystallization apparatus.

FIG. 1 is a schematic diagram of a two-stage freeze-crystallization concentration system 10 which is typical of prior art systems. The first stage includes first freezer-crystallizer 12 and complementary first wash column 14. Similarly, the second stage includes second freezer-crystallizer 16 and complementary second wash column 18. Both stages usually also contain additional ancillary equipment such as melters, condensers, heat exchangers, pumps, etc. For purposes of clarity in illustrating the invention, however, such ancillary equipment has not been shown nor described herein. It will be recognized by those skilled in the art that such ancillary equipment would, of course, be used in combination with the various apparatus specifically described herein.

In the system of FIG. 1, a highly contaminated aqueous feed stream, which consists of two pounds of 20% concentrate, passes along feed line 20 and is diluted by introducing two pounds of water via flow line 22 prior to introduction into first freezer-crystallizer 12. This dilution has heretofore been performed to avoid problems associated with concentrating a highly contaminated feed stream in the first stage. One pound of ice removed from second wash column 18 is additionally introduced into first freezer-crystallizer 12 via flow line 13. Thus, 4 pounds of 10% diluted feed and 1 pound of ice are introduced, making an overall input of 5 pounds having about a 7% concentration.

One or more immiscible secondary refrigerants, such as the fluorocarbon refrigerants marketed by duPont under the tradename FREON, can then be fed in liquid form from a pressurized vessel (not shown) into first freezer-crystallizer 12 wherein it mixes with feed. The pressure within freezer-crystallizer 12 is low enough to allow the refrigerant to vaporize, and as it does, it withdraws sufficient heat from input feed to cause the formation of ice crystals. The amount of ice formed can be controlled by the amount and type of refrigerant used. In this case, sufficient refrigerant is introduced to form a slurry consisting of 3 pounds of pure ice crysals and 2 pounds of 20% concentrate. This slurry is withdrawn through exit flow line 24. Alternatively, of course, the cooling required can be supplied by a primary refrigeration process.

The slurry of ice and 20% concentrate is introduced into the bottom of first pressure wash column 14. Therein, the slurry is separated, in a conventional way, into its pure ice and concentrate components. 2 pounds of 20% concentrate are withdrawn from first wash column 14 in second stage input line 26; 3 pounds of pure ice crystals are also harvested from the top of first wash column 14 and introduced into melter 28.

The 2 pounds of 20% concentrate introduced into second freezer-crystallizer 16 are treated therein to produce an ice slurry consisting of 1 pound of pure ice crystals and 1 pound of 40% concentrate which is withdrawn via exit line 32. This slurry is then fed into the bottom of second wash column 18 wherein the ice is separated from 40% concentrate and washed. 1 pound of 40% concentrate output is withdrawn from the system via line 34. The pound of ice crystals harvested at the top of second wash column 18, having been washed with 20% concentrate, is not pure. These ice crystals are coated with a film of 20% concentrate, and, for this reason, they are recycled to first freezer-crystallizer 12 via flow line 13.

Wash water is introduced into the tops of both first wash column 14 and second wash column 18 to wash film concentrates from the surface of ice crystals contained therein. As illustrated, pure wash water can be used in first wash column 14, whereas it is preferable to use 20% concentrate wash water in second wash column 18. In the mass balances illustrated, the mass of the wash water has been ignored since it is insignificant in comparison to the throughput of these systems. The wash water for each column can be obtained from several sources, some of which are illustrated by dashed flow lines in FIG. 1.

Melter 28 forms three pounds of purified water from the 3 pounds of ice introduced therein. Of these, 2 pounds of water are recirculated within the system by passing them in line 22 to incoming feed in line 20. These 2 pounds of water serve, therefore, to provide the required dilution of input feed. The third pound of purified water produced in melter 28 is withdrawn from the system as purified water output via output line 36.

As can be seen, the system illustrated in FIG. 1 processes 2 pounds of 20% concentrated feed input to produce 1 pound of pure water output and 1 pound of 40% concentrate output. To accomplish this, it is necessary for this system to produce a total of 4 pounds of ice; 3 pounds in first freezer-crystallizer 12 and 1 pound in second freezer-crystallizer 16.

Figure 2:
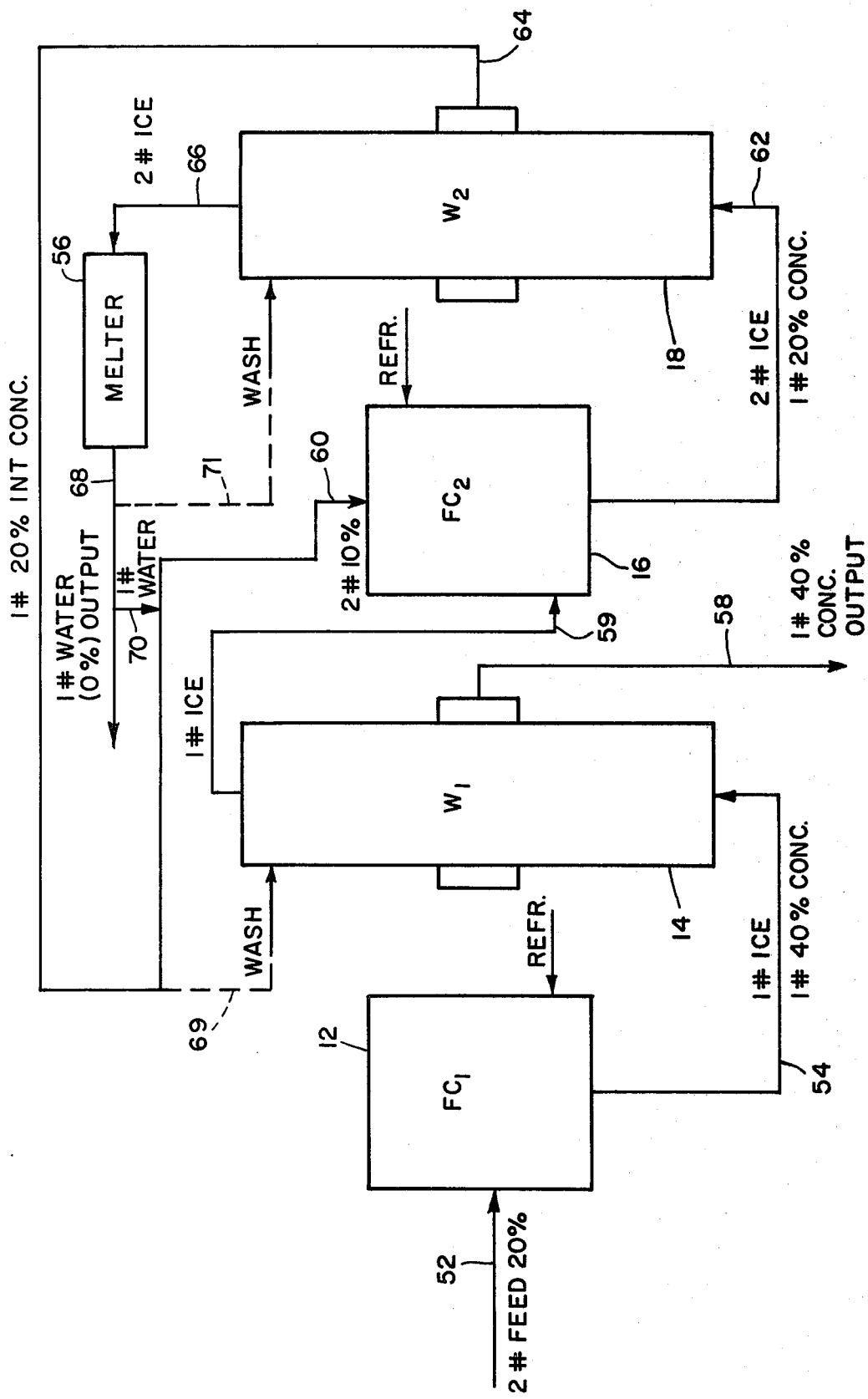
FIG. 2 is a schematic representation of a two-stage freeze-crystallization concentration apparatus embodying the principles of this invention.

A two-stage freeze-crystallization concentration apparatus 50, according to this invention, is illustrated in FIG. 2. Many individual pieces of equipment are the same as illustrated in the system of FIG. 1. For example, the first stage includes first freezer-crystallizer 12, together with a complementary first wash column 14, and the second stage includes second freezer-crystallizer 16 and a complementary second wash column 18. There are, however, significant differences in this system and in the method of employing even those pieces of equipment which are the same.

As was the case with the system of FIG. 1, 2 pounds of highly contaminated aqueous feed (20% concentrate) is used, but it is introduced directly into first freezer-crystallizer 12 via input line 52 in this embodiment. There is no prior dilution. First freezer-crystallizer 12 operates as previously explained to treat this feed stream to produce a slurry consisting of 1 pound of pure ice crystals and 1 pound of 40% concentrate. This slurry is fed via exit flow line 54 into the bottom of first wash column 14.

In the first wash column 14, the slurry is separated into its pure ice crystal and 40% concentrate components. One pound of ice is harvested at the top of first wash column 14 and directed to second freezer-crystallizer 16 via flow line 59. 1 pound of 40% concentrate output is withdrawn from first wash column 14 through output flow line 58. Thus, there is no dilution of the highly contaminated feed stream prior to its introduction into the first stage, and highly concentrated (e.g., 40%) output is withdrawn from the system directly from the first stage.

1 pound of water formed in melter 56 is combined via flow line 70 with 1 pound of recirculated intermediate concentrate in second stage input line 60. As a result, 2 pounds of a 10% concentrate is introduced into second freeze-crystallizer 16. By introducing refrigerant into second freeze-crystallizer 16, 1 additional pound of pure ice crystals are formed so that 1 pound of 20% concentrated and 2 pounds of ice exit through output flow line 62. This ice slurry is introduced into the bottom of second wash column 18 wherein the ice is separated from intermediate concentrate and washed. Intermediate concentrate produced in the second stage has a concentration of 20%. This intermediate concentrate exits through flow line 64 and is combined with the pound of water from melter 56 in flow line 60. Thus, dilution takes place in this system after the first stage and prior to the second stage, and the total dilution is one-half of that performed in the system of FIG. 1.

2 pounds of ice are harvested at the top of second wash column 18 and are transported via line 66 to melter 56. Therein, 2 pounds of purified water are formed and withdrawn in line 68. 1 pound is used to dilute feed to second freezer-crystallizer 16, as previously described, and 1 pound is withdrawn from the system as output.

Wash water is introduced into the tops of both first wash column 14 and second wash column 18 through lines 69 and 71, respectively. As in the FIG. 1 system, the amount of wash water introduced is insignificant compared to the throughput of the freeze-crystallization concentration system, and so it has been ignored in the mass balances. Because ice crystals formed in first freezer-crystallizer 14 are coated with a highly concentrated film, a concentrated wash, such as 20% concentrate, is used. This can be obtained from a number of sources, including from the input feed or from recirculated intermediated concentrate; optional flow lines are indicated by dashed lines in FIG. 2 to show possible sources of wash water. Relatively pure wash water can be used in second wash column 18, since the ice film therein is less concentrated than in first wash column. This also may be obtained from several sources, and one such source is indicated with a dashed flow line.

The use of the first stage to treat highly contaminated feed without prior dilution results in a significant energy savings compared to that consumed in prior systems. As has been illustrated in FIG. 2, only 3 pounds of ice need be produced. In prior art two-stage freezer-crystallizer systems, such as that shown in FIG. 1, it was necessary to produce 4 pounds of ice for the same throughput. Since much of the energy used in these systems is energy required to produce ice, a significant reduction in energy can be achieved. Based on the assumptions for these systems, the savings is about 25%, and yet the throughput and output products for these systems are identical.

Those skilled in the art will know, or be able to ascertain, using no more than routine experimentation, many equivalents to the specific elements and steps used in describing this invention. It is well known, for example, that gravity wash columns can be substituted for the pressure columns specifically described herein. Such equivalents are within the scope of this invention and are intended to be covered by the claims appended hereto.

What is claimed is:

1. A freeze-crystallization apparatus for concentrating a feed stream, comprising, in combination:
   a first stage including:
      first freezer-crystallizer means for treating the feed stream to produce a slurry of ice and highly concentrated output;
      means for introducing the feed stream into said first freezer-crystallizer means without prior dilution;
      first wash column means for washing and separating ice produced in said first freezer-crystallizer means from highly concentrated output, said first wash column means including means for introducing concentrated wash water therein;
      means for introducing slurry from the first freezer-crystallizer means into said first wash column means;
      means for harvesting ice from said first wash column means; and,
      means for withdrawing highly concentrated output from said first wash column means;
   a second stage including:
      second freezer-crystallizer means for treating diluted concentrate to produce ice and an intermediate concentrate;
      means for introducing diluted concentrate into said second freezer-crystallizer means;
      second wash column means for washing and separating ice produced in said second freezer-crystallizer means from intermediate concentrate, said second wash column means including means for introducing wash water therein;
      means for harvesting ice from said second wash column means; and,
      means for withdrawing intermediate concentrate from said second wash column; and,
      means for diluting said withdrawn intermediate concentrate to form diluted concentrate for introduction into said second freezer-crystallizer means.

2. A freeze-crystallization apparatus of claim 1 wherein said first and said second freezer-crystallizer means include a freezer-crystallizer having means to introduce an immiscible refrigerant therein.

3. A freeze-crustallization apparatus of claim 2 wherein said first and said second wash column means include a pressure wash column wherein slurry is introduced at the bottom and ice is harvested at the top thereof.

4. A freeze-crystallization apparatus of claim 3 wherein said means for diluting intermediate concentrate withdrawn from said second wash column includes means for melting ice harvested from said second wash column and means for combining a portion of said melted ice with intermediate concentrate prior to its introduction into said second freezer-crystallizer.

* * * * *